United States Patent [19]
Yoshikawa

[11] Patent Number: 5,392,035
[45] Date of Patent: Feb. 21, 1995

[54] TRANSPARENT COORDINATE DETECTION DEVICE
[75] Inventor: Osamu Yoshikawa, Tokyo, Japan
[73] Assignee: SMK Corporation, Tokyo, Japan
[21] Appl. No.: 116,397
[22] Filed: Sep. 3, 1993
[30] Foreign Application Priority Data
 Nov. 30, 1992 [JP] Japan .................. 4-088558[U]
[51] Int. Cl.$^6$ ............................................ H03M 1/22
[52] U.S. Cl. ......................................................... 341/5
[58] Field of Search .................... 341/5, 17; 367/129; 178/18

[56] References Cited
U.S. PATENT DOCUMENTS
 4,897,510  1/1990  Tanaka et al. ................. 178/18

Primary Examiner—Brian K. Young
Attorney, Agent, or Firm—Peter J. Gluck; Thomas R. Morrison

[57] ABSTRACT

A coordinate detection device has upper and lower resistive plates. Pressure on the upper resistive plate causes the two plates to come into electrical contact at a point of the pressure allowing an external device to compute the coordinates of the applied pressure. Each resistive plate has a layer of transparent resistor material over a transparent substrate. Two parallel electrodes of silver are spaced apart on each resistive plate to create a linear potential gradient therebetween. The electrodes are connected across a voltage potential via lead wires which are made from the same material as the transparent resistor.

10 Claims, 3 Drawing Sheets

TRANSPARENT COORDINATE DETECTION DEVICE

BACKGROUND OF THE INVENTION

The present invention relates to a transparent coordinate detection device. Specifically, the present invention relates to a transparent tablet of a transparent coordinate detection device wherein the lead wires are integrally formed with the transparent resistor film.

Transparent membrane touch panels for use with the screen of a cathode ray tube are well known in the prior art. The heart of the system is the coordinate detection substrate, which includes a lower transparent plate oriented in one direction, and an orthogonally oriented upper transparent plate. The application of pressure to the upper plate forces it into electric contact with the lower, which enables external systems to determine the coordinates of the applied pressure.

A conventional transparent tablet of a coordinate detection substrate according to the prior art is shown in FIGS. 3–6. Referring to FIG. 3, an X-axis resistance plate 2 has a roughly rectangular shape. A first pair of electrodes 1A and 1B are formed along the ends of X-resistance plate 2 in a X-direction 17. Conductors 6 and 7 connect electrodes 1A and 1B, respectively, to their respective contacts X1, X2, and Y3.

A Y-axis resistance plate 5 is positioned below X-resistance plate 2. A second pair of electrodes 4A and 4B are placed along a Y-axis direction 16 of Y-axis resistance plate 5. A small space is maintained between the plates by non-conductive dot spacers 3. Conductors 8 and 9 connect electrodes 4A and 4B to their respective contacts Y1, Y2 and X3.

A switch 11 selectively applies current from a power supply 10 to either first pair of electrodes 1A and 1B or second pair 4A and 4B. Switch 11 also has a pole connected to an input of an analog to digital converter 12 which converts the voltages between selected pairs of electrodes into digital signals. An operation circuit 13 converts these digital signals into the X and Y coordinate values.

Referring now to FIG. 4, an X-axis resistance plate 2 of a transparent tablet has a substrate 2A upon which a transparent resistor 2B has been formed as a uniform thin film. First pair of electrodes 1A and 1B, usually silver or other conductive metals, are placed apart on transparent resistor 2B at predetermined intervals. A pair of lead wires 6A and 7A, which are made from the same material as the first pair of electrodes, 1A and 1B, connect each electrode 1A and 1B to conductors 6 and 7, respectively.

The conventional transparent coordinate detector as described above operates as follows. Referring now to FIG. 3, switch 11 is set at positions X1, X2 and X3, and current is supplied to first pair of electrodes 1A and 1B from power source 10. Referring now to FIG. 4, equipotential lines represent a potential gradient created on transparent resistor 2B between electrode 1A, which is at a high potential, and electrode 1B, which is at a low potential.

Referring now to FIG. 5, a pen 14 is applied against a desired portion of the surface of X-axis resistance plate 2. The pressure causes the X-axis resistance plate to bend against dot spacers 3, resulting in electrical contact with Y-axis plate 5. Once the short circuit is achieved, the resistances of circuit elements Rx1–Rx6 form a voltage divider in the equipotential lines previously formed between electrodes 1A and 1B.

Referring once again to FIG. 3, the resistances between the location of pen 14 and the first pair of electrodes 1A and 1B are Rx1 and Rx2, respectively. The contact resistances between conductors 6 and 7 and X-axis resistance plate are Rx3 and Rx4, respectively. The resistances of the individual conductors is Rx5 and Rx6. The voltage divider thus created by the pen is given by the equation:

$$V_{Ref} = \frac{Vcc \times (Rx2 + Rx4 + Rx6)}{(Rx1 + Rx2 + Rx3 + Rx4 + Rx5 + Rx6)}$$

$V_{Ref}$ is input into A/D converter 12 as the X-axis coordinate information via the Ry2 side of Y-axis resistance plate 5. A/D converter 12 also receives power supply 10 as an input through a variable resistor 15. Once the above two signals are digitized, operation circuit 13 calculates the X-axis coordinate location depressed by pen 14 in accordance with the above equation.

With pen 14 in the same position, switch 11 switches from the X contacts to the Y contacts at Y1, Y2 and Y3. In a similar manner to X-axis resistance plate 2, a voltage divider is created by pen 14 as follows:

$$V_{Ref} = \frac{Vcc \times (Ry2 + Ry4 + Ry6)}{(Ry1 + Ry2 + Ry3 + Ry4 + Ry5 + Ry6)}$$

$V_{Ref}$ is input to A/D converter 12 through Rx2. $V_{Ref}$ and power supply 10 are digitized by A/D converter 12, which in turn is processed by operation circuit 13 to produce the corresponding Y coordinate value.

A/D converter 12 and operation circuit 13 present a high input impedance, which neutralizes their influence on the coordinate measurements by Rx2 and Ry2 and on the contact resistance between X-axis resistance plate 2 and Y-axis resistance plate 5.

A drawback of the prior art is that electrodes 1A and 1B and lead wires 6A and 7A are made of silver, which results in high production and material costs.

In order to overcome the above drawback, it has been suggested to replace the conductive silver in the device with integrally forming lead wires 6A and 7A of the same material as transparent resistor 2B. Such a configuration is shown in FIG. 6, in which lead wires 6B and 7B are integrally formed with transparent resistor 2B.

A drawback of the above suggestion is that the transparent resistor material has a higher resistance than silver. The absence of a low resistance equipotential silver electrode across ends of transparent resistor 2B results in a non-linear potential gradient. In the case of the uniformly formed plate of FIG. 6, the resistance along the edges is dependent upon the distance from the points where the integrally formed lead wires meet the resistor plate. As a result, a warped potential gradient, shown by field lines V, is produced which prevents accurate coordinate calculations.

OBJECTS AND SUMMARY OF THE INVENTION

Accordingly, it is an object of the present invention to produce a transparent coordinate detection device which overcomes the drawbacks of the prior art.

It is a further object of the present invention to produce a transparent coordinate detector which utilizes lead wires made from a transparent resistor material which is integrally formed with the transparent resistor film of the resistance plates.

The present invention comprises a transparent tablet for a transparent coordinate detection device. A transparent resistor film is applied to a transparent substrate. Parallel electrodes are deposited on the transparent resistor to form a uniform potential gradient therebetween when current is applied. The electrodes are connected to a power source via lead wires which are made from, and integrally formed with, the transparent resistor film.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
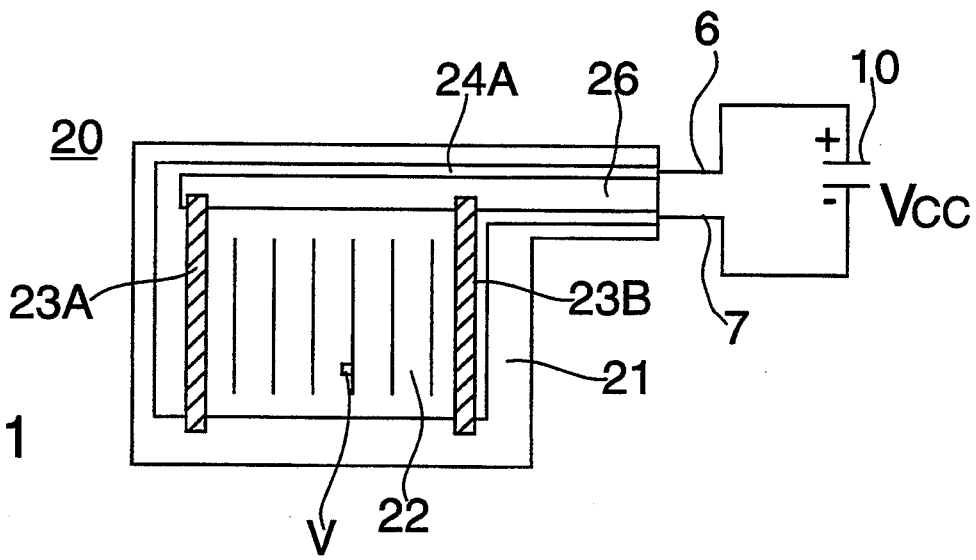
FIG. 1 is a plain view of a transparent tablet of the present invention.

Referring to FIG. 1, a transparent tablet 20 includes a transparent substrate 21 of glass formed into a roughly rectangular shape. A transparent resistor 22 of Indium—Tin Oxide (ITO) is formed over transparent substrate 21 as a thin film with uniform thickness (ITO is made from In and $SnO_2$, which is more transparent than ordinary $SnO_2$).

A pair of parallel slender electrodes 23A and 23B, formed usually of silver or of another good conductor, are placed on the surface of the transparent resistor 22. In the preferred embodiment, electrodes 23A and 23B are vertical as shown in FIG. 1.

A pair of lead wires 24A and 24B, separated by a recess 26, are electrically in contact with electrodes 23A and 23B, respectively. Lead wires 24A and 24B are formed integrally with transparent resistor 22, and are made from the same material. Both lead wires 23A and 23B have the same uniform thickness as transparent resistor 22.

Figure 2A:
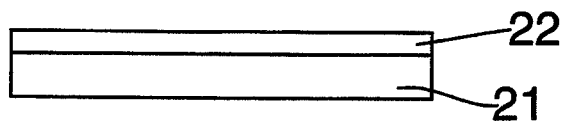
FIGS. 2(a)-(e) schematically illustrate a process for forming a transparent tablet of the present invention.
Figure 2B:
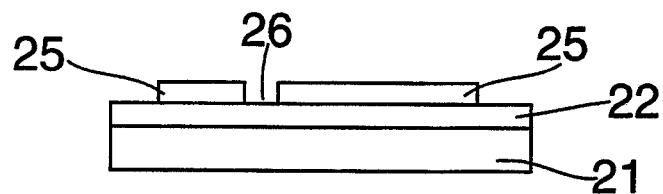
Figure 2C:
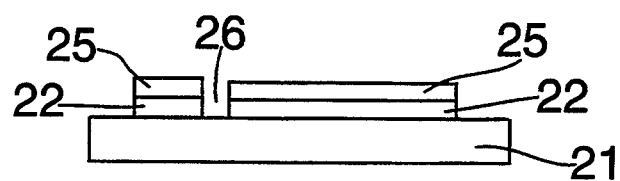

Referring now to FIG. 2, the formation of transparent tablet 20 is illustrated by the steps shown in FIGS. 2(a)-2(c). Referring now to FIG. 2(a), transparent substrate 21 is prepared in a specified shape. ITO is splattered on transparent substrate 21 using standard techniques, forming transparent resistor 22.

Referring now to FIG. 2(b), a masking member 25 is laminated on the transparent resistor 22. Masking member 25 is formed in a pattern of a desired shape of transparent resistor 22 and lead wires 24A and 24B.

Figure 2D:
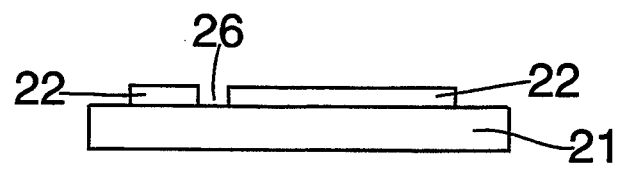

Referring now to FIGS. 2(c)-(d), the exposed portions of transparent substrate 21 are etched using standard etching techniques to produce the desired pattern. Masking member 25 is then removed.

Figure 2E:
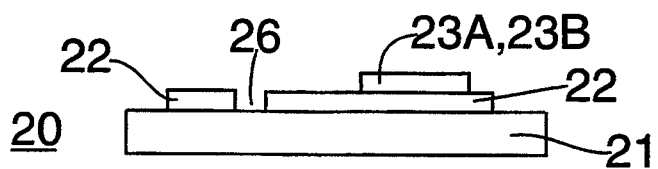
Figure 3:
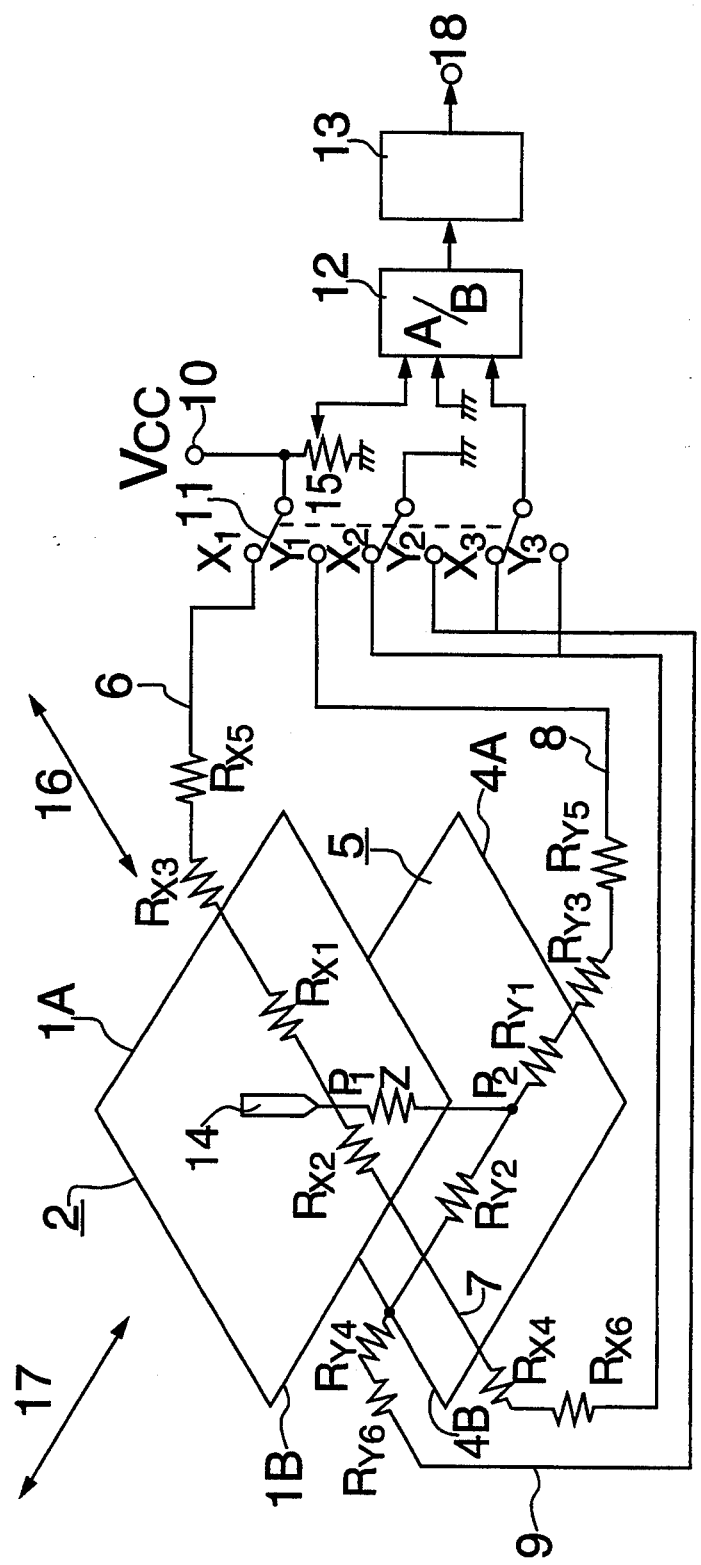
FIG. 3 is a plain view schematic of a transparent coordinate detector of the prior art.
Figure 4:
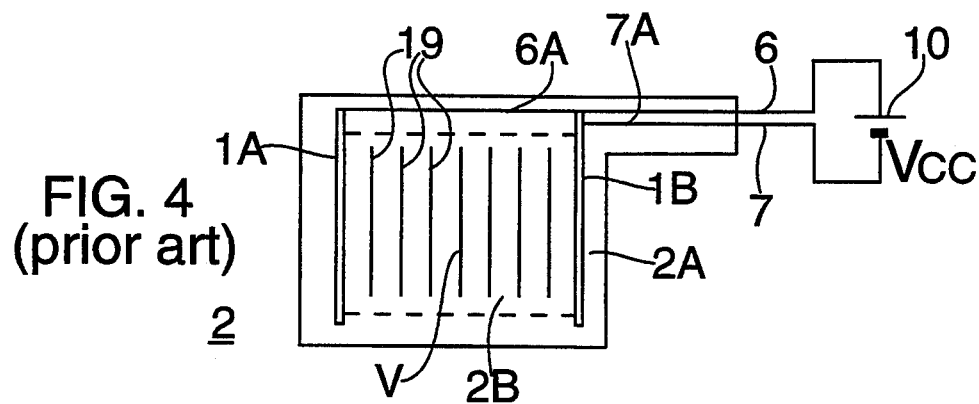
FIG. 4 is a plain view of a transparent tablet of the prior art.
Figure 5:
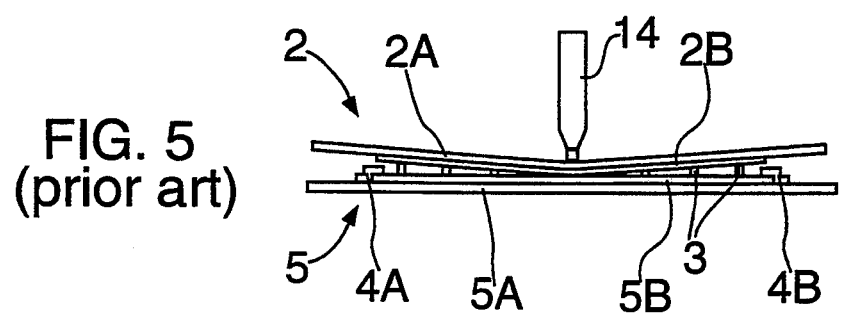
FIG. 5 is a cross section of the transparent tablet of the prior art.
Figure 6:
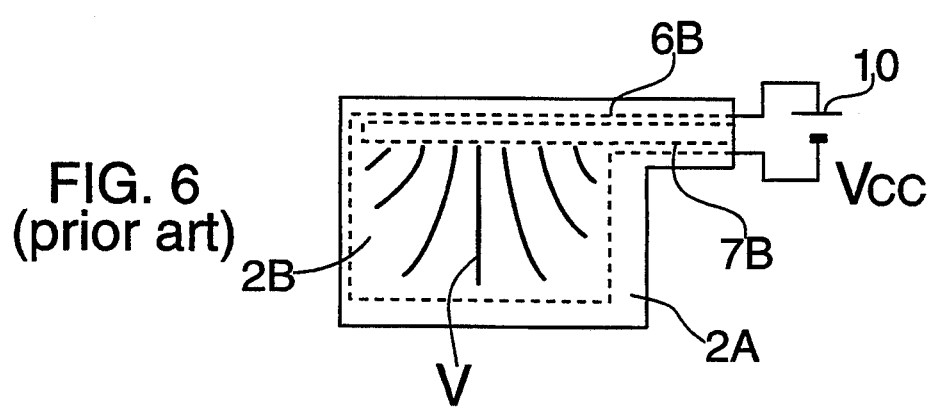
FIG. 6 is a plain view of a transparent tablet using only transparent resistance materials.

Referring now to FIG. 2(e), silver electrodes 23A and 23B are applied using screen printing to the desired locations of transparent resistor 22.

Since the coordinate detection substrate has both an X and a Y resistance layer, a second transparent tablet must be prepared according to the above steps. In this tablet, the electrodes and lead wires are configured perpendicularly to the electrodes of the first plate. The plates are then superimposed to form the entire coordinate detection substrate.

As described above, lead wires 24A and 24B are made from the same material and at the same time as transparent resistor 22. Hence, the present invention uses less silver to result in lower production and material cost.

The present invention is not limited to the above materials suggested for the construction of the individual elements. Any substance which can form a transparent substrate can be used for transparent substrate 21. Typical examples include glass and acrylic resins. Transparent resistor 22 and lead wires 24A and 24B may be ITO or Silver Oxide. Electrodes 23A and 23B can be made from any good conductor, preferably silver or gold.

Having described preferred embodiments of the invention with reference to the accompanying drawings, it is to be understood that the invention is not limited to those precise embodiments, and that various changes and modifications may be effected therein by one skilled in the art without departing from either the scope or spirit of the invention as defined in the appended claims.

What is claimed is:

1. A transparent tablet for a transparent coordinate detection device comprising:
    a plate having a transparent resistive film covering a tablet area thereof;
    means for connecting said resistive film to a voltage potential;
    said means for connecting being contiguous with said resistive film and integrally formed from said resistive film extending outside said tablet area; and
    means for establishing a voltage gradient in said resistive film, between said means for connecting, said voltage gradient having a planar configuration with substantially linear equipotential lines on said transparent resistance plate.

2. A transparent tablet for a transparent coordinate detection device according to claim 1 wherein said means for connecting and said resistive film covering said tablet area are integrally formed from the same material, said material including one of ITO and silver oxide.

3. A transparent tablet for a transparent coordinate detection device according to claim 1, wherein said means for establishing further comprises:
    first and second conductive electrodes; and.
    said first and second conductive electrodes being parallel and spaced a predetermined distance apart to define an Operational area of said tablet.

4. A transparent tablet for a transparent coordinate detection device according to claim 3, wherein said first and second conductive electrodes are substantially metallic and have a lower resistance than said transparent resistance plate.

5. A transparent tablet for a transparent coordinate detection device comprising:
    a plate a plate area having of a transparent resistance material thereon;

first and second electrodes contacting said transparent resistance material;

said first and second electrodes being aligned to produce a linear planar potential gradient therebetween;

first and second lead wires of transparent resistance material;

said first and second lead wires being connected to said first and second electrodes, respectively; and means for permitting connection of said first and second lead wires across a voltage potential.

6. A transparent tablet for a transparent coordinate detection device according to claim 5, wherein said first and second lead wires are formed of the same transparent resistance material covering said plate area.

7. A transparent tablet for a transparent coordinate detection device according to claim 5, wherein said first and second lead wires and said transparent resistance material on said plate area are integrally formed.

8. A transparent tablet for a transparent coordinate detection device according to claim 5, wherein said desired linear equipotential gradient includes an equipotential distribution parallel to said first and second electrodes.

9. A transparent tablet for a transparent coordinate detection device comprising:

a transparent resistor plate;

first and second parallel metal electrodes on said plate being spaced apart a predetermined distance;

said transparent resistor plate including first and second lead portions adjacent to said first and second parallel metal electrodes, respectively;

said transparent resistor plate and said first and second lead portions being integrally formed from the same material; and means for permitting connection of said first and second lead portions across a voltage potential.

10. A coordinate detection device, comprising;

upper and lower plates;

means for separating said upper and lower plates until a pressure is applied to one of said upper and lower plates;

said upper plate including a first pair of parallel metal electrodes;

said lower plate including a second pair of parallel metal electrodes;

said first pair of parallel metal electrodes being orthogonal to said second pair of electrodes;

means for selectively connecting said first and second pairs of parallel metal electrodes across a voltage potential;

said upper and lower plates including a transparent resistor between said first second pairs of parallel metal electrodes, respectively;

at least a portion of said means for selectively connecting being made from, and integrally formed with, a same material as said transparent resistor.

* * * * *